United States Patent [19]

Bellhouse et al.

[11] 4,357,239
[45] Nov. 2, 1982

[54] TRANSFER MEMBRANE APPARATUS

[76] Inventors: Brian J. Bellhouse, The Lodge, North St., Islip, Oxfordshire; William S. Haworth, Redding Wyck House, Market St., Charlbury, Oxfordshire, both of England

[21] Appl. No.: 206,544
[22] PCT Filed: Nov. 21, 1979
[86] PCT No.: PCT/GB79/00199
§ 371 Date: Jun. 12, 1980
§ 102(e) Date: Jun. 12, 1980
[87] PCT Pub. No.: WO80/01042
PCT Pub. Date: May 29, 1980

[30] Foreign Application Priority Data
Nov. 22, 1978 [GB] United Kingdom ............... 45577/78

[51] Int. Cl.³ .............................................. B01D 31/00
[52] U.S. Cl. .................... 210/321.3; 210/356; 422/48
[58] Field of Search ................... 165/157, 166, 167; 422/48; 55/16, 158; 210/356, 456, 321.3, 321.1

[56] References Cited

U.S. PATENT DOCUMENTS

| 3,238,703 | 3/1966 | Straschil et al. | 55/158 |
| 3,256,678 | 6/1966 | Bertin et al. | 55/158 |
| 3,616,930 | 11/1971 | Muir | 210/500.2 X |
| 3,864,248 | 2/1975 | Granger et al. | 210/356 X |
| 4,075,091 | 2/1978 | Bellhouse | 210/321.4 X |
| 4,111,659 | 9/1978 | Bowley | 422/48 |
| 4,173,537 | 11/1979 | Newhart | 210/321.3 |
| 4,182,653 | 1/1980 | Bellhouse | 422/48 X |
| 4,222,869 | 9/1980 | Kato | 210/356 X |

OTHER PUBLICATIONS

Bellhouse, et al., "Development of a Vortex Mixing Haemodialyser", from European Society for Artificial Organs, 11-21-78, vol. 18, 22 pp.

Primary Examiner—Frank A. Spear, Jr.
Attorney, Agent, or Firm—Murray and Whisenhunt

[57] ABSTRACT

A dialyser has a membrane assembly (14) comprising two U-shaped conduits partially defined, and separated, by a transfer membrane wall. The walls of the conduits are provided with furrowing at an inclination to the direction of flow through the conduit. Blood is pumped through one conduit by a roller pump (16) in series with a reciprocatory pump (18) and dialysate is pumped in counter current through the other conduit by a roller pump (23) in series with a reciprocatory pump (25). The reciprocatory pumps (18,25) are operated in phase so that the resulting pulsatile component in the two conduits is in phase. This pulsatile flow, in conjunction with the furrows, produces vortexes in, and good mixing of, the blood and dialysate in their respective conduits and hence enhanced contact of each of these liquids with the transfer membrane wall.

11 Claims, 6 Drawing Figures

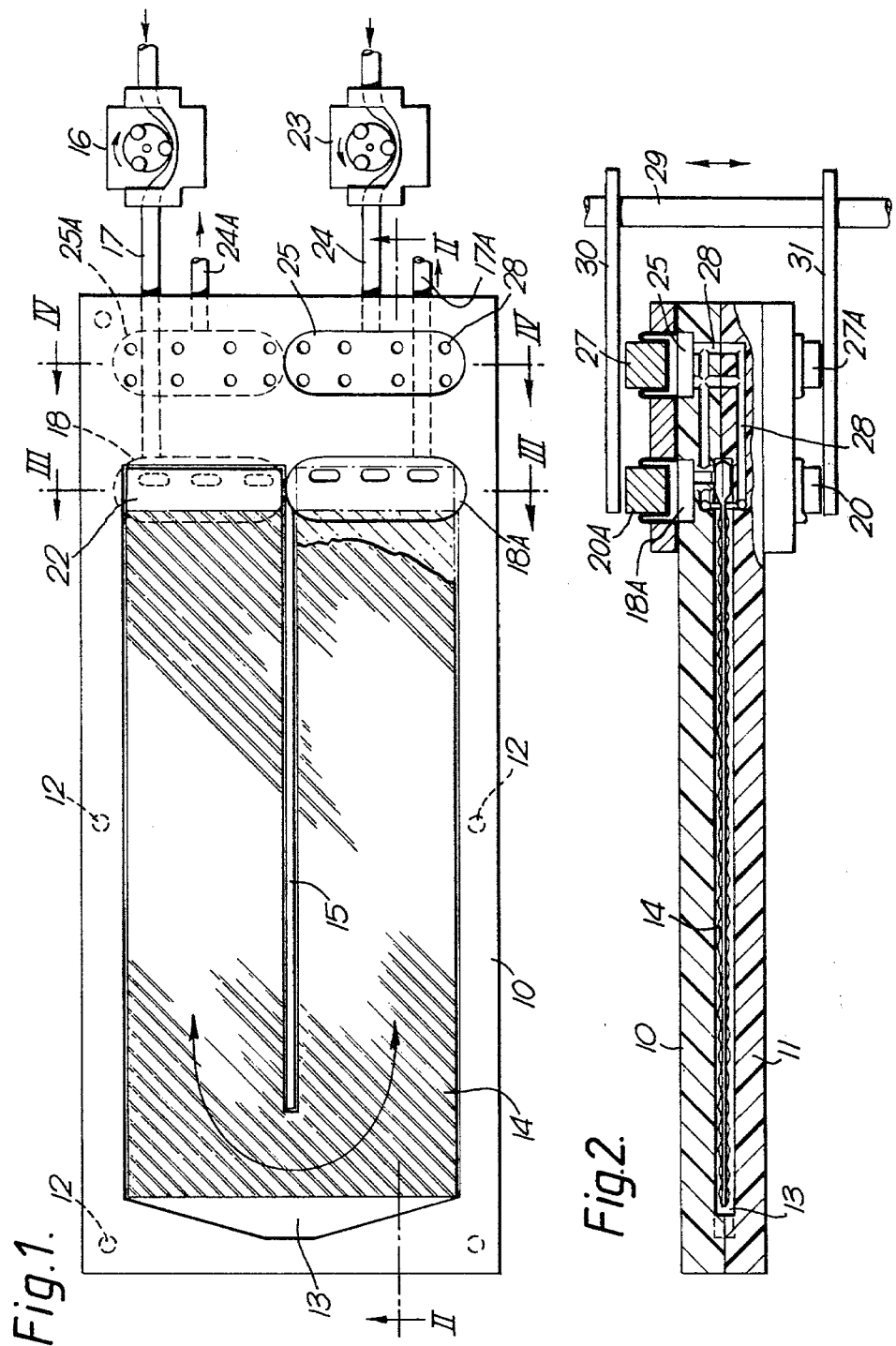

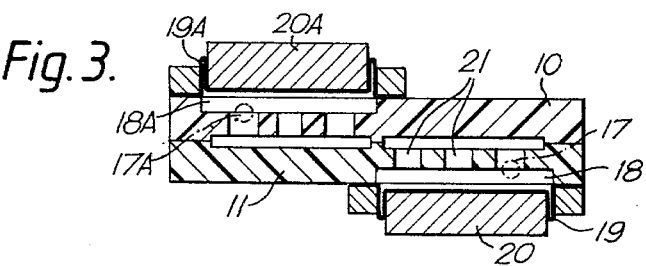
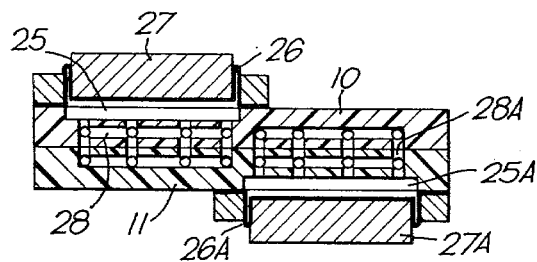
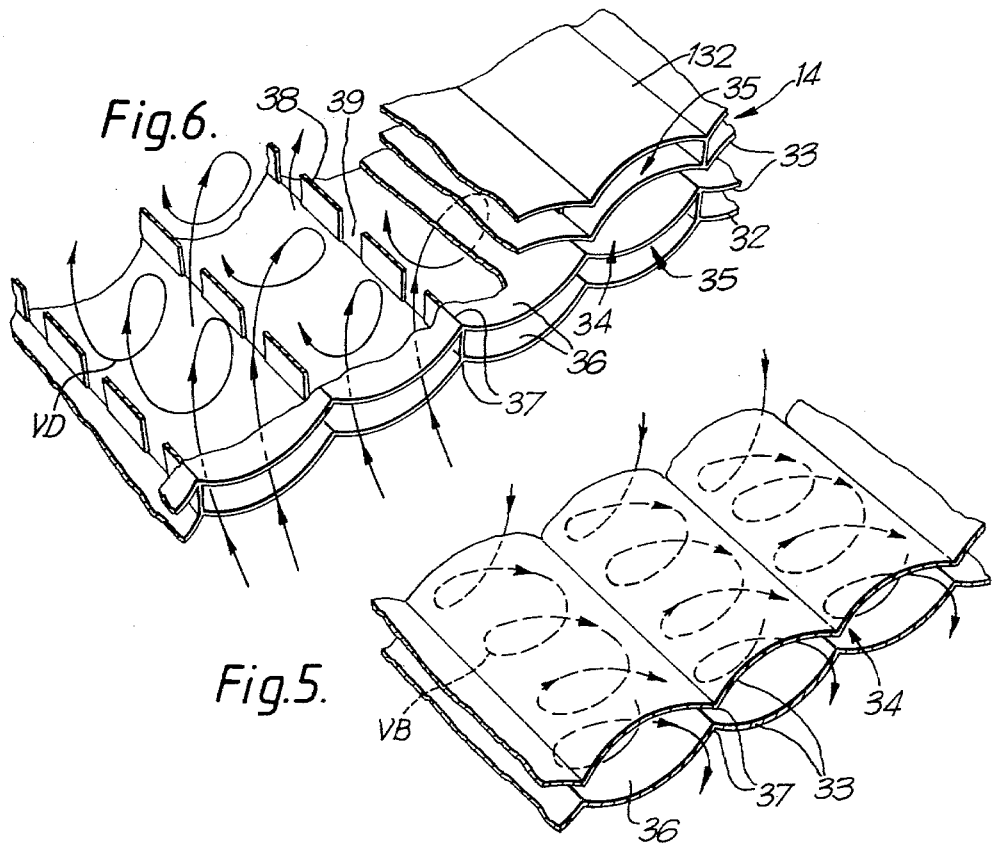

TRANSFER MEMBRANE APPARATUS

The invention is concerned with apparatus for effecting transfer of heat or mass between two fluids of which at least one is usually a liquid, through a transfer membrane. Such apparatus is used in blood oxygenators, that is artificial lungs, and dialysers, such as artificial kidneys, in which case one fluid is blood, and the other is oxygen or dialysate. In practice the efficiency of the transfer across the membrane is limited by the extent to which the total volume of fluid can be brought into close proximity with the membrane. It is not sufficient to reduce the thickness of the fluid layers, by reducing the thickness of the conduits in which they flow, as this increases undesirably the pressure drop across the apparatus and leads to uneven perfusion and regions of stagnation, which, in the case of blood, provides a danger of thrombosis.

We believe that the proper solution lies in so shaping the fluid flow conduits that significant mixing of the fluid occurs within the conduits. It has previously been proposed in British Patent Specification No. 1,442,754 to provide an apparatus comprising a conduit for flow of one of the fluids at least partially defined by the membrane, a transverse dimension of the conduit varying, either inherently or in response to pressure of fluid therein, in a regularly repeating manner, to provide a multiplicity of hollows in the membrane, the apparatus also comprising means communicating with the conduit for passing fluid through the conduit in pulsatile flow, the arrangement being such that pulsation of fluid past the hollows gives rise in the hollows to rotational fluid flow having components of motion parallel and perpendicular to the general direction of flow in the conduit of the fluid.

The conduit may be defined between two predominantly planar surfaces, so that it has an elongate cross section transverse to the general direction of mean flow through the conduit, at least one of the surfaces then being provided by the membrane in which the requisite hollows are provided by parallel furrows. Alternatively, the conduit may be tubular, that is essentially axisymmetric with its wall provided by a membrane and having alternate annular or helical hollows and ridges. In either case, it has previously been proposed to cause the two fluids, between which transfer is to be effected through the membrane, to flow on opposite sides of the membrane in countercurrent or crosscurrent.

While experimenting with these earlier proposals, particularly as applied to dialysers, in which both fluids are liquids, we have found that there is a likelihood of undesirable reverse ultrafiltration. This occurs when, as a result of the pulsatile flow of one or both liquids, dialysate pressure exceeds blood pressure, even transiently, and is a potential hazard to the patient.

We now find that the problem can be substantially overcome by providing pulsatile flow components in the two fluids in phase and in the same direction.

In accordance with the present invention therefore, apparatus for effecting transfer of heat or mass between two fluids through a transfer membrane comprises two conduits separated by a common wall formed by the membrane, a pumping means for pumping the two fluids with a mean countercurrent flow each through a respective one of the two conduits, and for applying to both fluids in the conduits in phase and in the same direction a superimposed pulsatile flow, a transverse dimension of a first one of the conduits varying, either inherently or in response to pressure of fluid therein, in a regularly repeating manner in the direction of the pulsatile flow component, to provide a multiplicity of hollows in the membrane such that pulsation of fluid past the hollows gives rise in the hollows to rotary flow having components of motion parallel and perpendicular to the direction of the pulsatile flow component in that conduit and to the membrane wall.

The synchronism of the pulsatile flow component of the two fluids, in the same direction on opposite sides of the transfer membrane, can be arranged substantially to eliminate the problem of reverse ultrafiltration.

Although the invention is applicable to an apparatus in which the conduit, to which the membrane wall presents hollows, is tubular, it is particularly applicable to an apparatus in which the two conduits are each defined between two predominantly planar surfaces so that each conduit has an elongate cross section transverse to the direction of mean flow through them. The hollows in the membrane will then most simply be formed by alternate furrows and ridges.

Since the fluids in both conduits are subjected to similar pulsatile flow components, it is desirable if this is used to generate the rotary flow in both conduits, in which case both the conduits, one on each side of the membrane, will be provided with the hollows. This may be achieved either by causing the transfer membrane to present hollows to both conduits, for example by being symmetrically undulating, or by the second conduit being provided at its wall remote from the first conduit with furrows or other hollows in alignment with the ridges in the transfer membrane corresponding to the hollows in the first conduit. When the first conduit is defined between two predominantly planar surfaces, there may be two second conduits of this construction, one on each side of the first conduit. Both walls of the first conduit, separating the first conduit from the two second conduits will then be formed by transfer membranes. Also, when at least one of the conduits is defined between two predominantly planar surfaces, in at least one of which the furrows are formed, the two surfaces may be separated along the ridges between the furrows by discontinuous webs, openings in which provide communication between adjacent furrows and allow the fluid to pass from one furrow to the next as jets. These jets assist in setting up eddies in the furrows into which they discharge.

When the conduits have elongate cross sections transverse to the direction of mean flow, the pulsatile flow component may be a reciprocating component in cross current to the mean flow of the fluids. In this case when the hollows are formed by furrows, the furrows will extend along the lengths of the conduit in the direction of the mean flow, or at least at an inclination, for example at 45°, to both the direction of mean flow and the direction of the pulsatile flow component. In both these cases the particle flow path will be generally zig-zag through the conduit. To keep the pressure fluctuations not only balanced across the membrane, but of minimum amplitude, the dimension of the conduit in the direction of the mean flow should be greater than that in the perpendicular direction. This assists in preserving concentration gradients in the direction of mean flow which is desirable for the transfer of mass at high effectiveness, for example, small molecular weight solutes in dialysers.

The similar cross pulsatile flow components in the two conduits are preferably produced by common pumping devices, for example incorporating a flexible bladder along each side edge of the conduits, and each being sub-divided into chambers communicating with a respective one of the conduits. The bladders at the opposite edges will then be activated in turn. For example by mechanically linked actuators which apply pressure to the opposite edges of the conduits. In order to avoid short circuiting of the fluid paths through the conduits, the bladders are preferably subdivided in the longitudinal direction so that each part of the bladder pumps fluid back into only an adjacent part of the conduits.

Alternatively, the pulsatile flow component of the fluids in the conduits is superimposed in the direction of mean flow. In this case when the hollows are formed by furrows the furrows will extend transversely, for example perpendicularly or at an inclination of say 45°, to the direction of flow. This has advantage over the cross pulsatile flow owing to the simplicity of the pumping arrangements which involve for each conduit a roller or other unidirectional pump to provide the mean flow through each conduit in series with a reciprocatory pump. The reciprocatory pump for each conduit may comprise two rolling diaphragms each communicating with a manifold at a respective end of the conduit, the pair of rolling diaphragms at one pair of adjacent ends of the two conduits being activated together and alternatively with the pair of rolling diaphragms at the other pair of adjacent ends of the two conduits, by mechanically linked actuators. It is then unnecessary to provide bladders or other pumping arrangements along the sides of the conduits and indeed if the conduits are of generally U-shape, so that both ends of both conduits are all adjacent to one another, all the pumps can be mounted adjacent to one another.

An example of a dialyser in the form of an artificial kidney, and constructed in accordance with the present invention, is illustrated diagrammatically in the accompanying drawings, in which:

FIG. 1 is a plan;

FIGS. 2, 3 and 4 are sections taken on the lines II—II. III—III. and IV—IV respectively in FIG. 1; and, FIGS. 5 and 6 are diagrammatic perspective views of parts of a membrane envelope assembly forming an essential part of the dialyser.

The illustrated dialyser comprises a rectangular housing formed of a cover and base parts 10 and 11 which are secured together by screws 12 and which are internally stepped to provide an internal generally rectangular shallow chamber 13. Located within the chamber 13 and supported by its close proximity to the walls of the chamber, is a membrane envelope assembly 14. As will become apparent from a subsequent description of FIGS. 5 and 6, the membrane envelope assembly includes four superimposed membrane layers of which the upper and lower membranes are impermeable and the inner two membranes semi-permeable. Adjacent membranes are sealed together around the outer edge of the assembly 14 and partway along a central line 15 to provide three superposed U-shaped conduits each defined between two predominantly planar surfaces so that each conduit has an elongate cross section transverse to its length. The upper and the lower conduit are intended for dialysate and the central conduit for blood.

At each end of the U the conduits of the membrane assembly are coupled with a system for the circulation of blood and dialysate. Thus blood is fed into one end (the upper right hand end in FIG. 1) of the blood conduit by means of a roller pump 16 and a duct 17 which leads into a manifold 18. The manifold 18 is provided with a rolling diaphragm 19 operated by an actuator 20. The manifold 18 communicates through passages 21 in the cover 10 with a manifold portion 22 at the adjacent end of the blood conduit. The seal between the manifold portion and the housing may involve for example a distributor in the membrane assembly which is clamped between the cover and base of the housing in alignment with the openings 21.

At its other end the blood circuit discharges in a similar manner into a manifold 18A also provided with a rolling diaphragm 19A and actuator 20A. A return blood duct 17A leads from the manifold 18A.

In an analogous manner dialysate is caused to flow, in counter current to the blood, through the U-shaped dialysate conduits by means of a roller pump 23 which pumps the dialysate along a duct 24 to a manifold 25 provided, like the blood inlet and outlet manifold 18 and 18A, with a rolling diaphragm 26 having an actuator 27. The manifold 25 communicates via a labyrinth of bored passageways 28 in the cover 10 and base 11 with manifolds at the adjacent end of the dialysate conduits. Again distributors clamped within the housing may be used to provide the seal between the conduit manifolds and passageways 18. At its other end the dialysate conduits terminate in manifolds which, in similar manner, are connected through passageways 28A to an outlet manifold 25A provided with a rolling diaphragm 26A with an actuator 27A. A dialysate outlet duct 24A leads from the manifold 25A.

The actuators 20,20A, 27 and 27A are actuated synchronously by means of a shaft 29 which is reciprocated axially by a conventional driving mechanism, and which carries laterally projecting arms 30 and 31. The arm 30 bears against the actuators 20A and 27 and the arm 31 bears against the actuators 20 and 27A. The effect of this is that the volumes of the manifolds 18A and 25 are reduced alternately with a reduction in the volumes of the manifolds 18 and 25A. The manifolds 18 and 18A with their rolling diaphragms and actuators therefore act as a reciprocatory pump which superimposes on the mean blood flow through the U-shaped blood conduit a superimposed reciprocatory component. The dialysate flows through the dialysate conduits with a similar mean flow in countercurrent to the mean flow in the blood conduit, with a superimposed reciprocatory component. Both reciprocatory components are in the general direction of the mean flow through the U-shaped conduits and in phase with one another.

The value of this composite pulsatile flow will be apparent from FIGS. 5 and 6. Thus as shown in FIG. 6 the membrane assembly comprises two outer impermeable membranes 32 and two inner membranes 33 of conventional transfer membrane material. The blood conduit is formed between the membranes 33 and is shown at 34 and the two dialysate conduits, formed between adjacent pairs of membranes 32 and 33, are shown at 35. Each of the membranes is shaped to provide a series of parallel furrows 36 separate by ridges 37. Each furrow 36 is approximately 3 mm. wide and between 1 and 1.5 mm. deep. The separation of the adjacent pairs of membranes 32 and 33 and the minimum separation of the membranes 33 at the ridges 37, are each substantially 0.5 mm. The spaces corresponding to the furrows 36 in the conduits 35 are separated by discontinuous spacer webs 38 in which rectangular slots 39 each 0.5 mm. deep and 0.5 mm. wide are spaced at 1 mm. intervals along the webs. Similar webs could be provided in the conduit 34.

The membranes 32 and 33 are provided with their furrowed shape by being assembled flat and appropriately sealed together and placed between furrowed plates. The conduits are pumped full of water which causes the plastics material from which the membranes are made to yield plastically beyond their elastic limit and adopt permanently the final shape.

As shown in FIG. 1, the furrows extend at substantially 45° to the two arms of the U-shaped conduits. As the blood and dialysate flow along their respective conduits, with a pulsatile flow, vortexes VB are formed in the furrows 36 in the blood conduit 34 and vortexes VD are formed in the dialysate flow in the furrows 36 in the dialysate conduits 35. These vortexes have a helical component owing to the inclination of the furrows to the direction of mean flow through the conduits. The vortexes are enhanced in the dialysate conduits 35 by the openings 39 through which jets of the dialysate pass and are deflected by the solid portions of the adjacent webs 38. The vortexes promote good mixing of the blood in the blood conduit and of the dialysate in the dialysate conduits and hence improved contact between the respective liquids and the transfer membranes 33. The vortexes are produced by the pulsatile flow and by the furrowing extending transversely to the direction of the pulsatile flow. In some cases it is desirable for the superimposed reciprocatory flow component actually to cause repetitive reversal of the direction of liquid flow in the respective conduits, although still allowing a mean flow of the liquid through its respective conduit.

An important feature, resulting from the synchronous operation of the actuators 20, 20A, 27 and 27A, is that the pressure differentials necessary to produce the reciprocatory flow components superimposed on two counter current mean flows of the blood and dialysate are in phase so that solvent transfer through the transfer membranes is not significantly effected by changing pressure differentials across the membrane.

The illustrated dialyser may have transfer membranes with a total effective area of 600 sq.cm., each U-shaped conduit being approximately 50 cms. long and 6 cms. wide. The blood and dialysate may have mean flow velocities of 30 ml./min. and 50 ml./min. respectively and the reciprocatory pumps may operate with a frequency of between 1 and 3 Hz. and a stroke volume of between 0.5 and 3 ml.

Further details of the principle of using pulsatile flow across furrows to produce vortexes are described in British Patent Specification No. 1,442,754.

Although the invention has been specifically described with relation to an artificial kidney, in which the transfer membranes are capable of passing selected molecules, the invention is equally applicable to heat transfer systems. In the latter case the transfer membranes will usually be made of a suitable metal.

We claim:

1. Apparatus for effecting transfer of heat or mass between two fluids through a transfer membrane, the apparatus comprising two conduits separated by a common wall formed by the membrane, a pumping means for pumping the two liquids with a mean counter current flow each through a respective one of the two conduits, characterised in that the pumping means (16,20,23,27) is also arranged to apply to both fluids in the conduits (34,35) in phase and in the same direction a superimposed pulsatile flow, a transverse dimension of a first one of the conduits varying, either inherently or in response to pressure of fluid therein, in a regularly repeating manner in the direction of the pulsatile flow component, to provide a multiplicity of hollows (36) in the membrane (33) such that pulsation of fluid past the hollows gives rise in the hollows to a rotary flow having components of motion parallel and perpendicular to the direction of the pulsatile flow component in that conduit and to the membrane wall (33).

2. Apparatus according to claim 1, in which the second one (35) of the conduits has a wall surface with a dimension transverse to the conduit varying in a regularly repeating manner in the direction of the pulsatile flow component to provide a multiplicity of hollows (36) such that pulsation of fluid past the hollows in the second conduit gives rise in the hollows to a rotary flow having components of motion parallel and perpendicular to the direction of the pulsatile flow component in the second conduit and to the membrane wall (33).

3. Apparatus according to claim 1 or claim 2, in which the two conduits (34,35) are each defined between two predominantly planar surfaces (32,33; 33,33) so that each conduit has an elongate cross section transverse to the mean direction of flow therethrough.

4. Apparatus according to claim 3, in which there are two second conduits (35) one on each side of the first conduit (34).

5. Apparatus according to claim 3, in which the hollows are formed by alternate furrows (36) and ridges (37).

6. Apparatus according to claim 5, in which the two predominantly planar surfaces, between which at least one of the conduits is defined, are separated along the ridges between the furrows by discontinuous webs (38), openings (39) in which provide communication between adjacent furrows and allow the fluid to pass from one furrow to the next as jets.

7. Apparatus according to claim 1 or claim 2, in which the pumping means (16,20,23,27) pumps the fluids in use through the conduits with the pulsatile flow component superimposed in the direction of mean flow.

8. Apparatus according to claim 7, in which the pumping means comprises for each conduit a uni-directional pump (16,23) in series with a reciprocatory pump (20,27).

9. Apparatus according to claim 8, in which the the uni-directional pump is a roller pump (16,23).

10. Apparatus according to claim 8, in which the reciprocatory pump for each conduit comprises two rolling diaphragms (19,19A; 26,26A) each communicating with a manifold (18,18A; 25,25A) at a respective end of the conduit, the pair of rolling diaphragms at one pair of adjacent ends of the two conduits being activated together and alternately with the pair of rolling diaphragms at the other pair of adjacent ends of the two conduits, by mechanically linked actuators (20,20A,27,27A).

11. Apparatus according to claim 7, in which the conduits (34,35) are generally of U-shape so that both ends of both conduits are all adjacent to one another.

* * * * *